(12) United States Patent  (10) Patent No.: US 7,460,738 B1
Ghosh et al.  (45) Date of Patent: Dec. 2, 2008

(54) SYSTEMS, METHODS AND DEVICES FOR DETERMINING AND ASSIGNING DESCRIPTIVE FILENAMES TO DIGITAL IMAGES

(75) Inventors: Arpan Ghosh, Parsippany, NJ (US); Cedric G. DeLaCruz, Maplewood, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

(21) Appl. No.: 11/740,075

(22) Filed: Apr. 25, 2007

Related U.S. Application Data

(63) Continuation of application No. 10/376,112, filed on Feb. 27, 2003, now Pat. No. 7,228,010.

(51) Int. Cl.
*G06K 9/54* (2006.01)

(52) U.S. Cl. .................. 382/305; 382/278; 382/307; 348/207.99

(58) Field of Classification Search ............. 382/278, 382/205, 306, 305, 307; 348/207.99, 231.2, 348/239
See application file for complete search history.

(56) References Cited

U.S. PATENT DOCUMENTS

| 2,764,901 | A | * | 10/1956 | Einar .................... 475/16 |
| 3,035,323 | A | * | 5/1962 | Robson ................. 432/241 |
| 3,725,236 | A | * | 4/1973 | Johnson, Jr. ............ 204/408 |
| 5,778,053 | A | * | 7/1998 | Skarbo et al. ......... 379/93.21 |
| 6,034,942 | A | * | 3/2000 | Yoshio et al. ......... 369/275.3 |
| 6,088,036 | A | * | 7/2000 | Morris .................. 345/428 |
| 6,253,201 | B1 | * | 6/2001 | Abdel-Mottaleb et al. ..... 707/4 |
| 6,337,951 | B1 | | 1/2002 | Nakamura |
| 6,360,234 | B2 | * | 3/2002 | Jain et al. ............... 715/201 |
| 6,462,778 | B1 | | 10/2002 | Abram et al. |
| 6,690,883 | B2 | * | 2/2004 | Pelletier ................ 396/321 |
| 6,829,624 | B2 | * | 12/2004 | Yoshida ................. 707/205 |
| 7,065,250 | B1 | * | 6/2006 | Lennon ................. 382/224 |
| 2003/0063321 | A1 | | 4/2003 | Inoue et al. |
| 2004/0041921 | A1 | | 3/2004 | Coates |
| 2004/0174434 | A1 | | 9/2004 | Walker et al. |

* cited by examiner

*Primary Examiner*—Yosef Kassa

(57) ABSTRACT

Systems, methods and devices are disclosed for determining and assigning descriptive filenames to digital images based on auxiliary input such as user provided input or input from some reference database of images.

18 Claims, 4 Drawing Sheets

US 7,460,738 B1

SYSTEMS, METHODS AND DEVICES FOR DETERMINING AND ASSIGNING DESCRIPTIVE FILENAMES TO DIGITAL IMAGES

CROSS REFERENCE TO RELATED APPLICATIONS

This application is a continuation of U.S. patent application Ser. No. 10/376,112, filed Feb. 27, 2003, of which is incorporated herein by reference in its entirety.

BACKGROUND OF THE INVENTION

The present invention relates generally to digital images and more specifically, to systems, methods and devices for determining and assigning descriptive filenames to digital images.

Digital photography has revolutionized picture taking. Digital cameras provide users the flexibility to rapidly view, edit, print and share pictures in ways that are not possible with conventional film based cameras. Digital cameras provide a multitude of benefits which cannot be readily matched by conventional film based cameras. For example, digital cameras provide users with the capability to immediately view pictures taken and thus the user can immediately save desired photographs and discard unwanted ones.

However, one area in which digital cameras provide no clear advantage over film based cameras is in the manner current digital cameras assign filenames to stored pictures. For example, confusing and obscure names such as "DIF0010" and "IMG1101" are currently used. While some camera manufacturers have gone so far as to include some rudimentary information within these naming conventions, such as the date and time the picture was taken, the end result is still that the picture filenames are tough to decipher and are in no way related to the actual content of the photograph. As a result, having a large collection of pictures can be difficult and confusing to manage since the filenames are very nondescript and unhelpful. In current practice, users typically have to manually rename each and every filename of every picture in order to have an easily manageable and searchable directory of photographs to peruse.

Accordingly, it would be desirable to have a way to easily and automatically assign helpful and descriptive names to digital photographs.

BRIEF SUMMARY OF THE INVENTION

The present invention relates to systems, methods and devices for determining and assigning descriptive names to digital images. Generally, in one embodiment of the present invention, auxiliary input, such as user provided speech, is utilized to assign descriptive names to the digital images. The user speech or other auxiliary input is processed to determine a descriptive filename for a certain digital image. Additionally, the image naming process can be performed in a more automated fashion using a database of stored reference images to provide descriptive identifiers for a digital picture based at least in part on the picture content so that in some manner, the assigned filename references some content of the digital image.

In one embodiment, the present invention is a method comprising the steps of capturing an image through an imaging component of a digital camera, converting the captured image into digital data via an imaging processing component of a digital camera, receiving auxiliary data to be associated with the digital image via an image naming component of a digital camera, storing the digital data in an image storage component of a digital camera, the digital data being associated with a filename referencing the received auxiliary data.

In yet another embodiment, the present invention is a device comprising an image capturing component operative to capture optical images, an image processing component operative to process the optical images into digital images, an image naming component operative to name the captured digital images and a storage component operative to store the captured digital images with filenames provided by the image naming component, the image naming component using one or more external information inputs to determine the filenames.

In still yet another embodiment, the invention comprises a program storage medium having instructions contained thereon for performing steps comprising receiving data representing a digital image, comparing the data representing the digital image with a set of reference data and assigning a filename to the digital image based on the comparison.

DETAILED DESCRIPTION OF THE INVENTION

The present invention is a system, method and apparatus for determining and assigning descriptive names to digital images. Generally, in one embodiment of the present invention, auxiliary input, such as user provided speech, is utilized to assign descriptive names to the digital images. The user speech or other auxiliary input is processed to determine a descriptive filename for a certain digital image. Additionally, the image naming process can be performed in a more automated fashion using a database of stored reference images to provide descriptive identifiers for a digital picture based at least in part on the picture content so that in some manner, the assigned filename describes at least some aspect or conveys information about the content of the digital image. These and other related embodiments are now discussed in more detail.

Figure 1:
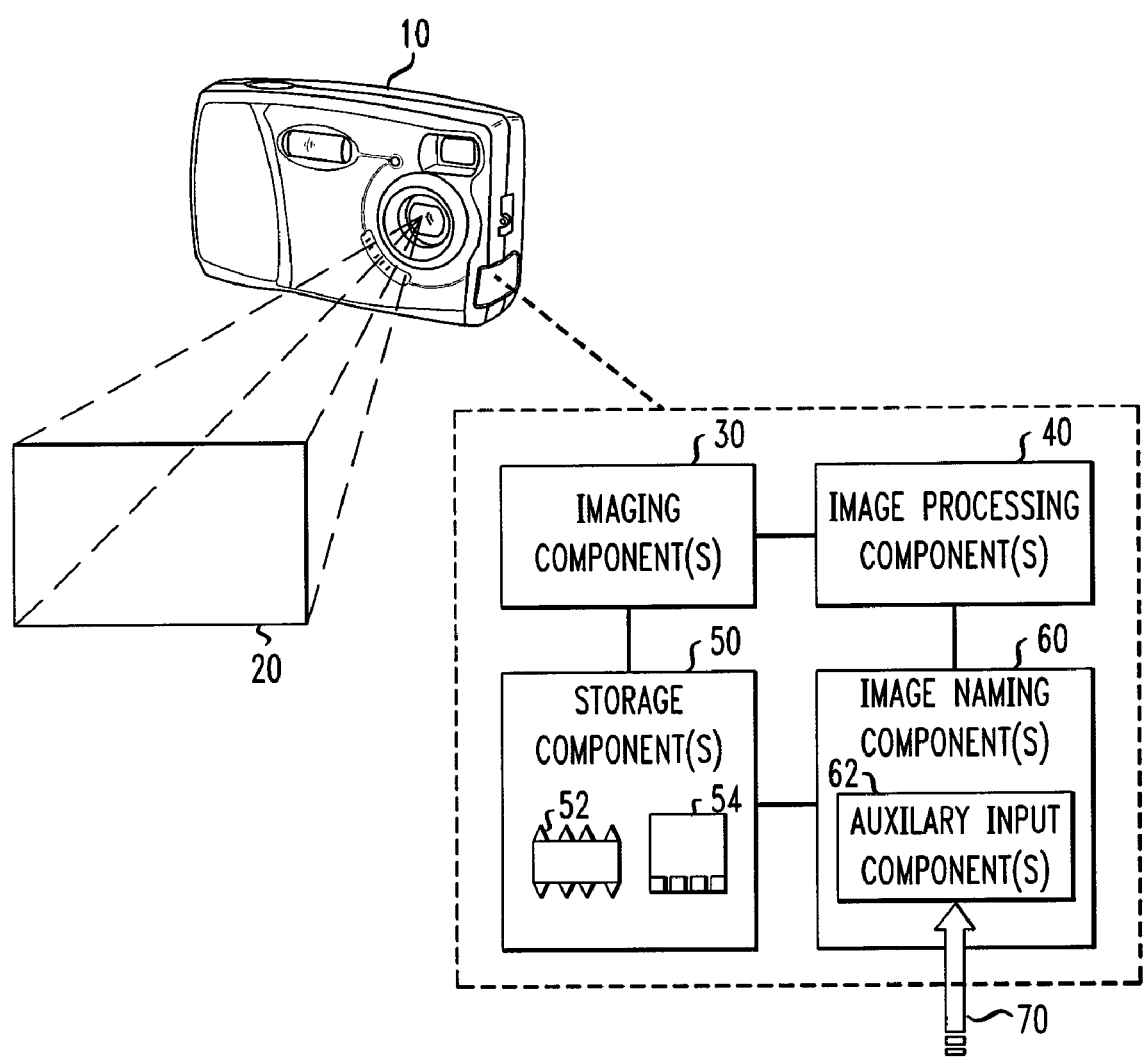
FIG. 1 illustrates one embodiment of a device in accordance with the teachings of the present invention.

Referring now to FIG. 1, a block diagram of an exemplary digital camera device 10 is shown according to the present invention. In this embodiment, digital camera 10 is enabled to capture, process and store one or more digital images 20. Digital camera 10 comprises at least one or more imaging components 30, one or more image processing components 40, one or more storage components 50 and one or more image naming components 60. It is contemplated that digital camera 10 may include other components, such as componentry effective to establish an external connection to and from an external computer (not shown), such as the necessary serial, parallel, SCSI, IEEE1394 and/or USB ports and related circuitry (also not shown).

In the present invention, one or more of the imaging components 30 may include at least a lens and an image sensor such as a charge coupled device (CCD) image sensor, a complementary metal oxide semiconductor (CMOS) based image sensor or other similar types of image sensors (the aforementioned separate components not shown individually but represented collectively as imaging component(s) 30). In an exemplary mode of operation, raw image data is captured via one or more of the imaging components 30 such as via the lens and the CCD image sensor. The captured raw image data is provided to the one or more image processing components. In the present invention, one or more of the image processing components 40 may include a central processing component, such as a microprocessor or central processing unit (CPU), a system bus and an analog to digital converter (A/D) suitable for converting raw analog image data to a digital format (the aforementioned separate components not shown individually but represented collectively as image processing component(s) 40). In one embodiment, the central processing component typically includes a conventional processor device for controlling the operation of digital camera 10. In the preferred embodiment, the CPU is capable of concurrently running multiple routines to control the various processes of digital camera in conjunction with the other camera componentry. In other embodiments, image processing components 40 may also include one or more image correction components to perform image correction processing steps as may be necessary.

Still with reference to FIG. 1, one or more of the storage components 50 of the present invention may include a non-volatile read-only memory (ROM) 52 which stores a set of computer-readable program instructions to control the operation of digital camera 10. ROM 52 is typically coupled to a CPU, such as referenced above, to control the operation of digital camera 10. Another of the storage components comprises a removable storage medium or memory 54 that serves as a primary image data storage area and is preferably a non-volatile device, readily removable and replaceable by a camera user. In other embodiments, removable storage medium 54 is a disk based storage medium, such as a high-density disk storage medium or optical storage medium. Additional storage components 50 may include an image data compression/expansion component for compressing processed image data to conserve storage space on the removable memory (not shown). Such an image data compression/expansion component may be used to encode and decode the images using known image compression methods that transform the images into and out of compressed formats such as GIFF, JPEG, MPEG or any other known image compression method.

In the present invention, it is contemplated that one or more removable storage memory mediums may replace a full removable memory medium with an empty removable memory medium to effectively expand the picture-taking capacity of digital camera 10. In the preferred embodiment of the present invention, removable storage medium 54 is typically implemented using a small, removable, solid-state Flash memory device or card. Image data to be stored on the memory medium 54 may also be data-compressed by a data compression component, whereafter it is recorded on a memory card in a file format of a versatile operating system with data of an image stored typically as a single identifiable file and associated with a single filename assigned in accordance with the teachings of the present invention. The manner of storing or writing information within or to the memory medium is preferably implemented according to known standards.

Still with reference to FIG. 1, one or more of the image naming components 60 of the present invention may comprise one or more auxiliary input components 62 to enable auxiliary information 70 to be used for selecting and assigning filenames to digital images. In one embodiment, the auxiliary input components 62 may comprise at least a microphone and one or more speech recognition processing components coupled to the microphone such as an acoustic processor, speech coder and digital signal processor (the aforementioned separate components not shown individually but represented collectively as auxiliary input component(s) 62). Such auxiliary input components 62 may be configured to receive and process user speech in either a speaker-dependent or speaker-independent manner. In one embodiment, the auxiliary input components 62 would be configured in a speaker-independent manner so as to be capable of accepting voice commands from any user. In another embodiment, the auxiliary input components 62 would be configured in a speaker dependent manner thereby necessitating the user to train the device with specific instances of that user' speech as is known in the art.

In an exemplary mode of operation, a person or user (not shown) speaks a word or phrase, generating a speech signal, i.e. a word or words to be associated as the filename for a certain digital image. The speech samples are provided to an auxiliary input component, such as an acoustic processor for parameter determination. The acoustic processor produces a set of parameters that models the characteristics of the input speech signal. The parameters may be determined in accordance with any of a number of known speech parameter determination techniques including, e.g., speech coder encoding and using fast fourier transform (FFT)-based techniques. In one embodiment, the acoustic processor may be implemented as a digital signal processor (DSP). The DSP may include a speech coder. Alternatively, the acoustic processor may be implemented as a speech coder as part of the auxiliary input components 62 shown in FIG. 1. Once the speech is processed, the words are utilized to assign a filename for a digital image which is stored on removable memory medium 54, as discussed earlier herein.

Figure 2:
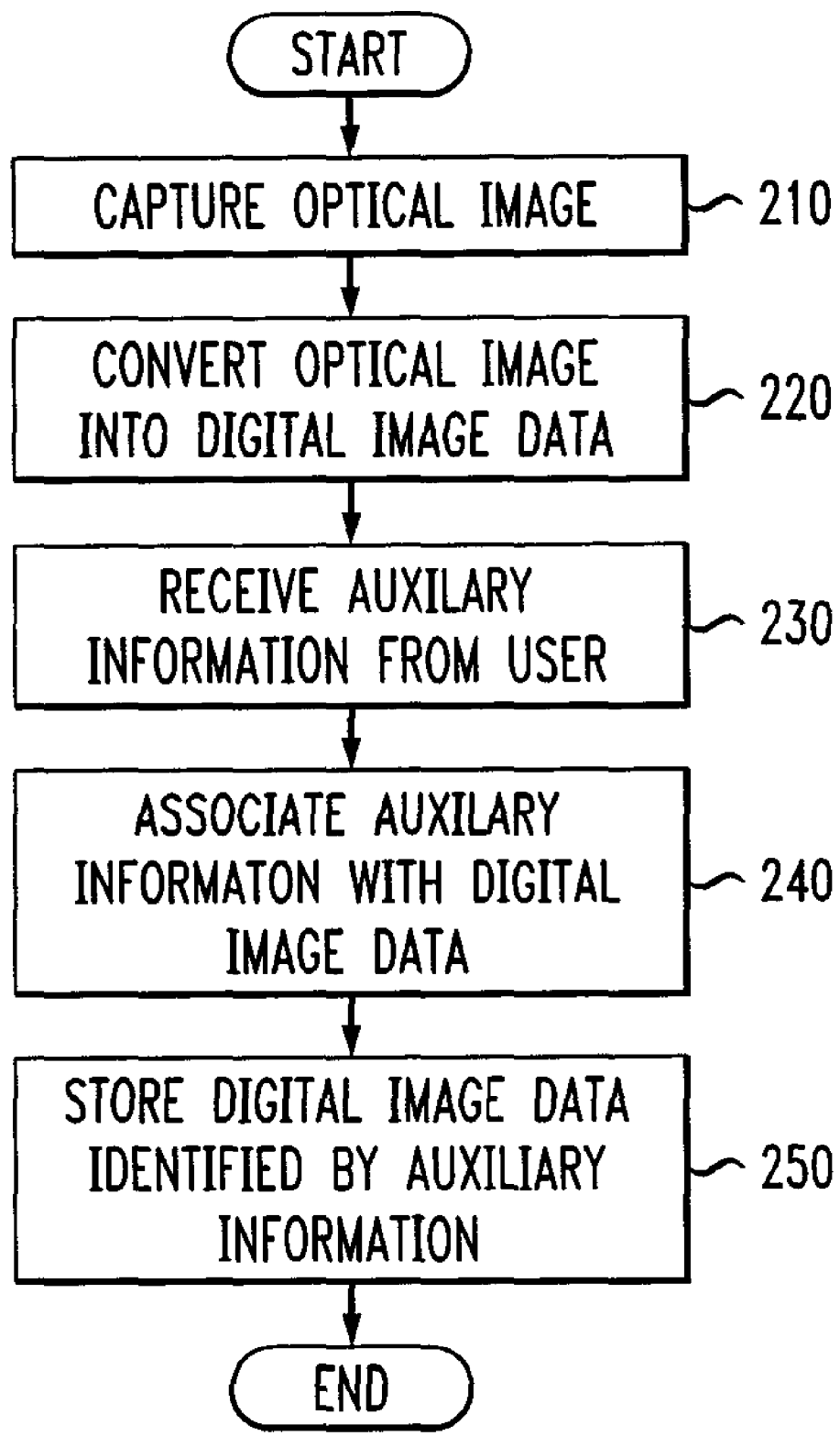
FIG. 2 illustrates one embodiment of a method in accordance with the teachings of the present invention.

Referring now to FIG. 2, an exemplary method of the present invention is shown. As discussed earlier herein, an optical image is captured, step 210, such as by one or more imaging components as shown and described with respect to FIG. 1. The captured optical image is converted into digital image data, step 220, such as by one or more image processing components as also shown and described with respect to FIG. 1. Auxiliary information is received from a user, step 230, such as by one or more image naming components as also shown and described with respect to FIG. 1. The received auxiliary information is associated with the digital image data, step 240, such as by one or more image naming components as shown and described with respect to FIG. 1 or alternatively, the filename association may be performed by one or more of the storage components also shown and described with respect to FIG. 1. The digital image data with the associated auxiliary is stored with the auxiliary information as the assigned filename, step 250, such as by one or more storage components as also shown and described with respect to FIG. 1

With general reference to the components of FIG. 1 and FIG. 2, one embodiment of a method illustrating an exemplary operative scenario from a user and device perspective is now discussed. In this exemplary operative scenario, a user aims the digital camera device at a subject or scene and minimally depresses the shutter release to initiate capturing of the image whereupon the camera automatically focuses on the subject and takes a reading of the available light. Typically, the camera automatically sets the aperture and shutter speed for optimal exposure, but alternatively, such settings may be set in advance manually by the user. The user then depresses the shutter release the rest of the way whereby an imaging component, such as a CCD is reset and then exposed to the light, building up an electrical charge, until the shutter closes. An image processing component, such as an A/D converter measures the charge and creates a digital signal that represents the values of the charge at each pixel. Another image processing component, such as a processor interpolates the data from the different pixels to create natural color as well as perform a level of compression on the data. At this point, the user may have already provided or may be prompted to provide some auxiliary information, such as some speech, in order to assign a filename to the digital image. The user may speak into a microphone provided on the digital camera. To the extent necessary to decipher or interpret the auxiliary information, the auxiliary information is processed, such as via speech recognition processing. The digital image is then stored on a storage component, such as a Flash memory card with the auxiliary information as a filename, which in the speech example, would be the word or words spoken by the user. Thus, the resulting digital image when accessed by the user would have a filename such as "SPOKENWORD.JPG" wherein the "SPOKENWORD" portion would contain the words spoken by the user up to a certain character limit as imposed by the camera operating file system. The ".JPG" extension refers to the file format of the digital image as is known in the art. It is contemplated that for purposes of the present invention, moving pictures, such as may be provided in an MPEG format may also be captured and named in accordance with the teachings of the present invention.

Figure 3:
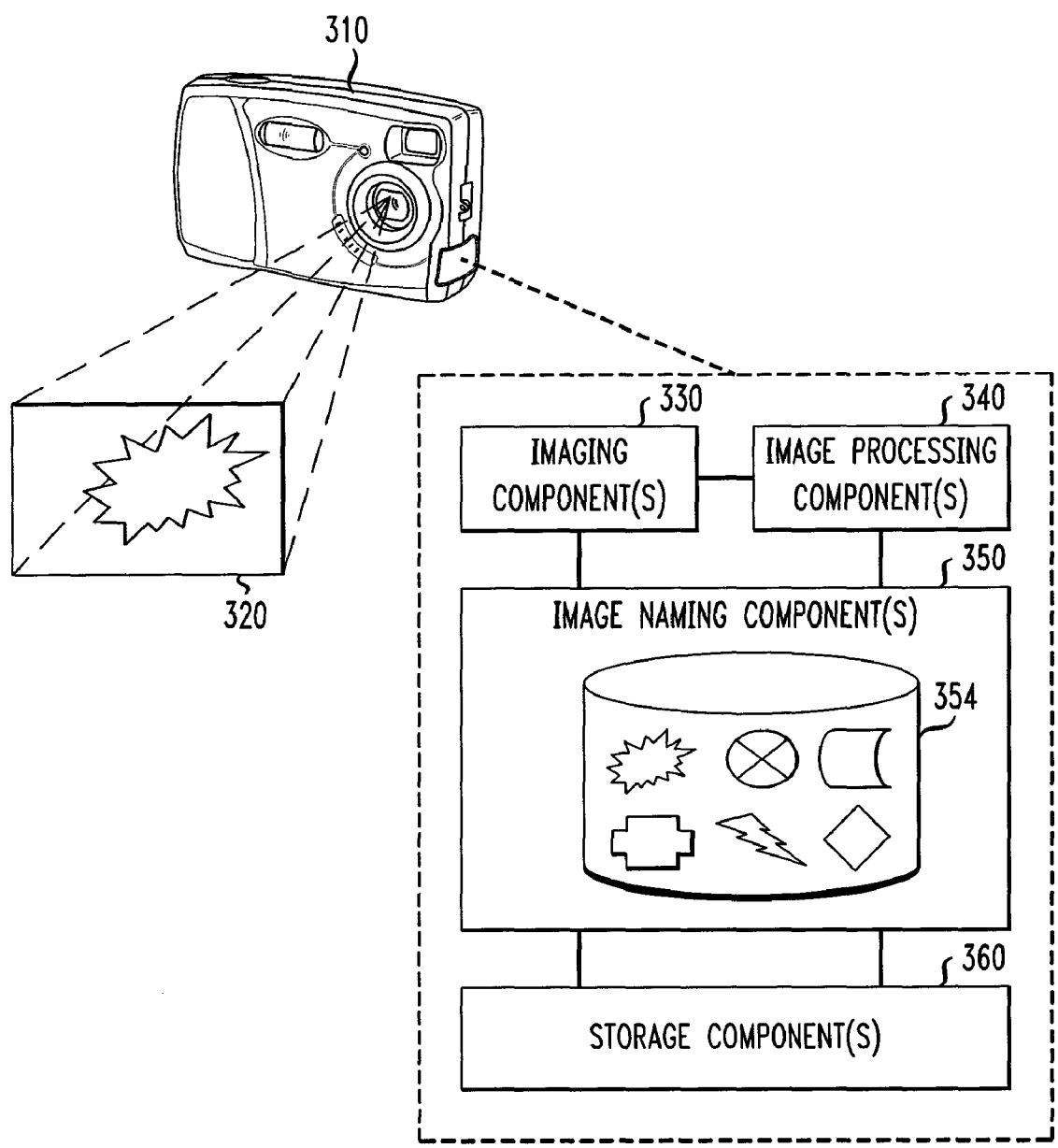
FIG. 3 illustrates another embodiment of a device in accordance with the teachings present invention.

Referring now to FIG. 3, a block diagram of another exemplary digital camera device 310 is shown according to the present invention. In this embodiment, digital camera 310 is also enabled to capture, process and store one or more digital images 320. Digital camera 310 includes at least one or more imaging components 320, one or more image processing components 340, one or more image naming components 350 which may further include one or more reference databases 354 and one or more storage components 360. As discussed earlier herein, it is further contemplated that digital camera may include other components, such as componentry effective to establish an external connection to and from an external computer (not shown), such as the necessary serial, parallel, SCSI, IEEE1394 and/or USB ports and related circuitry (also not shown).

In one exemplary operative scenario, an image 320 is captured by digital camera device 310 via image component(s) 330 is processed by image processing component(s) 340. The processed image is further processed by image naming component(s) 350 to determine a filename for the image, such as by comparing image 320 with images in a reference database 354. The image with the name of the matched image may then be saved via image component(s) 360.

Figure 4:
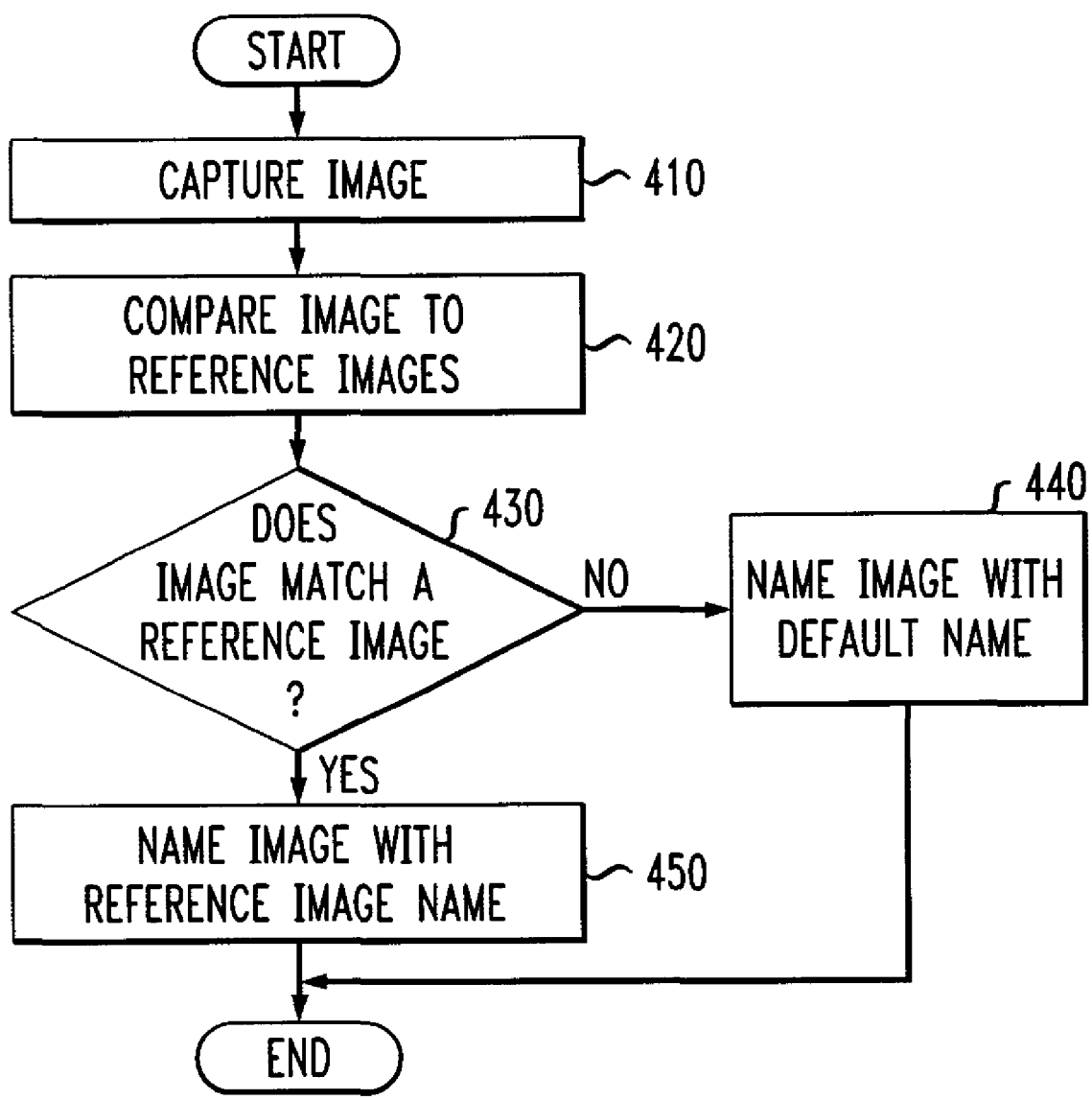
FIG. 4 illustrates another embodiment of a method in accordance with the teachings of the present invention.

Referring now to FIG. 4, another exemplary method in accordance with the teachings of the present invention is shown. In this embodiment, an image is captured, step 410. The captured image is compared to one or more reference images, step 420. It is determined if the captured image matches one or more of the reference images, step 430. For example, it is contemplated that in one embodiment, each reference image would have some identifying indicia associated with each reference image, such as relative size, color, density, shape, etc. and thus such identifying indicia may be compared with information garnered from the captured image to determine if the images meet some determined matching threshold so that a match can be made. If no match between the reference images and the captured images is made, the image may be named with a default name, step 440. If a match is made between the captured image and one of the reference images, the image is assigned a name associated with the reference image to which a match was established, step 450. In other words, the name of the matching reference image becomes the filename for the captured image. It is further contemplated that the present invention may be utilized to capture and assign filenames to videos or collections of still images in accordance with the steps and procedures above. For example, some scene analysis or comparison may be undertaken to assign a descriptive filename to a movie or collection of still images.

In the present invention, comparison of the image may be performed in part utilizing one or more of the image processing components and one or more of the image naming components. For example, in one exemplary operative scenario, a CPU stores in a memory a mapped image of binary values corresponding to the digital image. The mapped image stored in memory is suitably parsed and may be divided into subimages if necessary. The image is then compared to the reference images stored in the reference image database. The CPU compares the mapped image to the reference images. Based upon that comparison, the CPU will indicate that a given character image corresponds to a reference image. The CPU will also indicate the degree of confidence of the match by, for example, giving a numerical score for the accuracy of a match relative to one or more other matches until the best match is determined.

Specialized photographic applications may be undertaken utilizing the teachings of the present invention. In one exemplary embodiment, the invention may be applied to a smart underwater digital camera that could be used while snorkeling and/or scuba diving to identify underwater wildlife. In this embodiment, the digital camera could be provided with a reference database of tropical fish images that could then be compared with an image taken with the camera. The camera could then perform some image matching with the reference database to properly label a picture with the identity of the fish, i.e. a hypothetical filename could be "RedSnapper.jpg" for a image containing a Red Snapper. As discussed earlier herein, the present invention would accept whatever reference images are needed for the specific application and then perform the necessary comparison with certain captured images to assign descriptive filenames to the digital images. For example, the exemplary embodiment outlined above could easily be interchanged with other topical categories, e.g. wildlife, other than tropical fish, or the teachings herein could also be easily applied to more sophisticated identification, such as person identification or scene identification. In the present invention, it is contemplated that the reference images may be permanently or temporarily loaded or provided to the digital camera, such as via downloading the reference images to the camera via an external connection, such as the USB or IEEE1394 port to the flash memory, or permanently storing the images in a ROM.

With respect to the present invention, those of skill in the art would understand that the various illustrative blocks and steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Furthermore, while the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular device, situation, component or step to the teachings of the invention without departing from the scope thereof. Therefore, it is intended that the invention not be limited to the particular embodiment disclosed, but that the invention will include all embodiments falling within the scope of the appended claims.

What is claimed is:

1. A method of assigning filenames, the method comprising:
   storing a plurality of reference images grouped by topical category;
   recording video; and
   assigning a filename to the video based on a comparison of content in the video to the plurality of reference images wherein the filename is associated with the topical category.

2. The method of claim 1, wherein the topical category is generated by expected images to be a viewed by a video camera in a specific application.

3. The method of claim 1, wherein the topical category includes at least one of a person identification and a scene identification.

4. The method of claim 1, wherein the filename of the video is descriptive of one of the plurality of reference images.

5. The method of claim 1, wherein the plurality of reference images are stored temporarily while the video camera is used for a specific application.

6. The method of claim 1, wherein the assigned filename is drawn from at least one characteristic of a selected reference image.

7. The system for assigning filenames, the system comprising:
   a module configured to store a plurality of reference images grouped by topical category;
   a module configured to record video; and
   a module configured to assign a filename to the video based on a comparison of content in the video to the plurality of reference images wherein the filename is associated with the topical category.

8. The system of claim 7, wherein the topical category is generated by expected images to be a viewed by a video camera in a specific application.

9. The system of claim 7, wherein the topical category includes at least one of a person identification and a scene identification.

10. The system of claim 7, wherein the filename of the video is descriptive of one of the plurality of reference images.

11. The system of claim 7, wherein the plurality of reference images are stored temporarily while the video camera is used for a specific application.

12. The method of claim 7, wherein the assigned filename is drawn from at least one characteristic of a selected reference image.

13. A computer readable medium storing a computer program having instructions for controlling a computing device to assign filenames, the instructions comprising:
   storing a plurality of reference images grouped by topical category;
   recording video; and
   assigning a filename to the video based on a comparison of content in the video to the plurality of reference images wherein the filename is associated with the topical category.

14. The computer readable medium of claim 13, wherein the topical category is generated by expected images to be a viewed by a video camera in a specific application.

15. The computer readable medium of claim 13, wherein the topical category includes at least one of a person identification and a scene identification.

16. The computer readable medium of claim 13, wherein the filename of the video is descriptive of one of the plurality of reference images.

17. The computer readable medium of claim 13, wherein the plurality of reference images are stored temporarily while the video camera is used for a specific application.

18. The computer readable medium of claim 13, wherein the assigned filename is drawn from at least one characteristic of a selected reference image.

* * * * *